J. M. CISSELL.
BUMPER FOR AUTOMOBILES.
APPLICATION FILED JULY 27, 1921.
1,407,783. Patented Feb. 28, 1922.
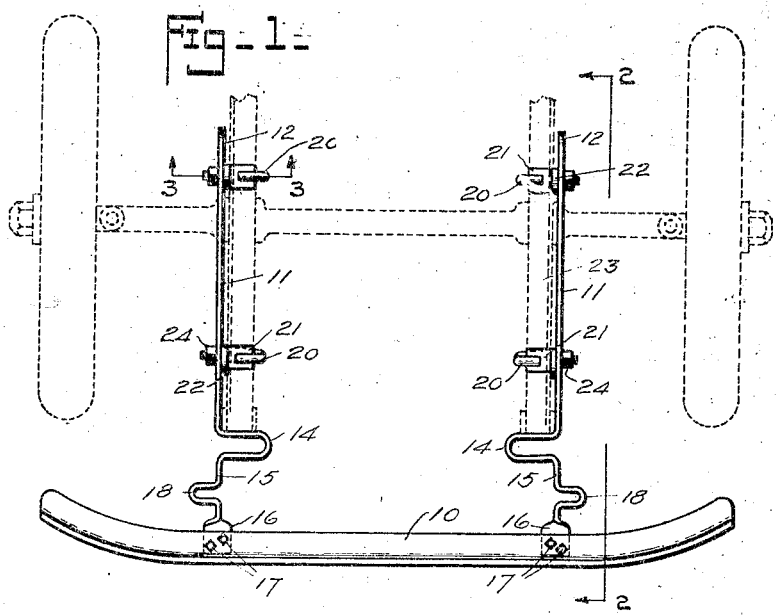
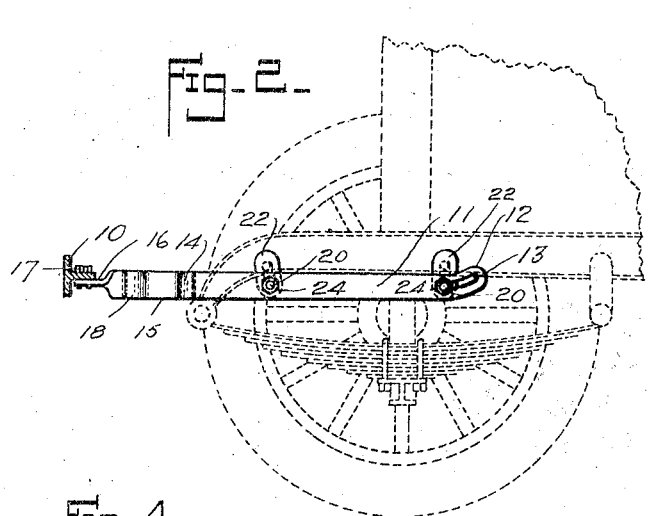
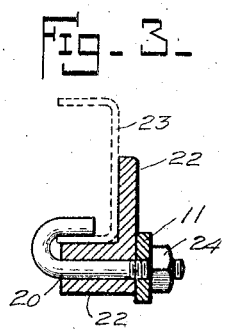
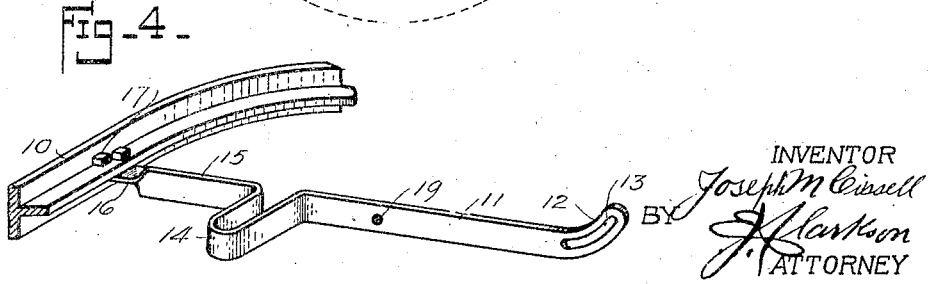
INVENTOR
Joseph M Cissell
BY
J. Clarkson
ATTORNEY

UNITED STATES PATENT OFFICE.

JOSEPH M. CISSELL, OF LOUISVILLE, KENTUCKY.

BUMPER FOR AUTOMOBILES.

1,407,783.  Specification of Letters Patent.  Patented Feb. 28, 1922.

Application filed July 27, 1921. Serial No. 488,038.

*To all whom it may concern:*

Be it known that I, JOSEPH M. CISSELL, a citizen of the United States of America, residing at Louisville, in the county of Jefferson and State of Kentucky, have invented certain new and useful Improvements in Bumpers for Automobiles, of which the following is a specification.

This invention relates to fenders especially adapted for use in connection with automobiles.

One important object of the invention is to improve and simplify the general construction of devices of this character.

A second important object of the invention is to provide a peculiar spring support for a fender bar which is so arranged that the bar is rigidly attached to the spring support while at the same time either end of the bar may yield to a blow without injury to the rigid attachment, the device being of improved and novel construction.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a plan view of the improved fender showing its application to an automobile, a portion of the latter being disclosed in dotted outlines.

Figure 2 is a view similar to Figure 1 but showing the fender in section on the line 2—2 of said Figure 1.

Figure 3 is an enlarged detail section on the line 3—3 of Figure 1.

Figure 4 is a detail perspective view of a portion of such fender with a modified form of spring support.

In carrying out the object of this invention there is provided a fender bar 10 which is preferably formed from a T-bar, this T-bar being positioned so that its stem is horizontal and its ends are curved backward as clearly shown in Figure 1. This T-bar is supported on the machine by certain spring supporting bars each of which consists of a straight body portion 11 having a forwardly curved extremity 12 provided with a bolt receiving slot 13. At the other end of the straight body portion 11 the bar is bent laterally inward and then outward to form a U-shaped spring 14. From the spring portion 14 the bar is extended forwardly as at 15 in alinement with the body 11 and its extremity is twisted to lie transversely of the portion 11 as shown at 16, this extremity being secured to the stem or web of the T-bar by suitable bolts 17. In the form shown in Figures 1 and 2 forwardly extending portion 15 is provided intermediate its ends with a U-shaped spring portion 18, this portion being disposed in an opposite direction to the portion 14. It will be observed from Figure 4 that in the form there shown the portion 18 is omitted. Toward the forward end of the portion 11 there is provided a bolt receiving opening 19 and through the openings 19 and 13 pass the hook bolts 20. On the stem of each of these hook bolts there is provided a clamp member 21 having a forwardly projecting finger 22, the body of the clamp member 21 fitting beneath the frame bar 23 of the automobile while the finger 22 projects up alongside of said frame bolt. It will be also observed from Figure 3 that the hook bolt engages the lower flange of this frame bolt so as to clamp it securely between the body of the member and the end of the hook bolt. The usual nuts 24 are employed to draw the hook bolt tightly in position.

In many of the devices of this description in which rigid bumper bars are employed difficulty is experienced when one or the other of the bumper bars comes into contact with an object because as that end is pushed back the bumper bar assumes a diagonal position between the two spring supports and unless these supports can yield laterally they bend or break. This defect is especially observable in devices of this character employing yieldable supporting members consisting of a rod telescoping in a sleeve. In the present device whenever one end of the bumper bolt is forced back the backward movement is resisted by the U-shaped spring portions while these same portions permit lateral yielding so that there is no breakage of either spring support.

There has thus been provided a simple and efficient device of the kind described and for the purpose specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In a device of the kind described, a rigid bumper bar, and supports for said bumper bar each consisting of a strip of spring material comprising a body portion carrying means for attachment to an automobile, an inwardly directed U-shaped spring portion at an end of the body portion, and a forwardly extending portion having its extremities twisted at right angles to the body portion and secured to the rigid bumper bar.

2. In a device of the kind described, a rigid bumper bar, and supports for said bumper bar each consisting of a strip of spring material comprising a body portion carrying means for attachment to an automobile, an inwardly directed U-shaped spring portion at an end of the body portion, and a forwardly extending portion having its extremity twisted at right angles to the body portion and secured to the rigid bumper bar, said forwardly extending portion including a U-shaped spring portion disposed between the extremities of the forwardly extending portion and extending from said portion in a direction opposite the first mentioned U-shaped spring portion.

3. The combination with a vehicle having longitudinally extending members, of a bumper bar, and spring supports therefore each secured to a respective longitudinal member and each consisting of a strip of strap spring metal having one end secured to the bumper bar and provided intermediate its ends with a laterally extending U-shaped spring portion having one leg resting against the forward end of the respective longitudinal member and constituting a stop against rearward movement of the support.

In testimony whereof I affix my signature.

JOSEPH M. CISSELL.